UNITED STATES PATENT OFFICE.

GEORGE F. von KOLNITZ, OF STOCKERTOWN, PENNSYLVANIA.

PROCESS OF OBTAINING POTASSIUM COMPOUNDS.

1,296,141.  Specification of Letters Patent.  Patented Mar. 4, 1919.

No Drawing.  Application filed July 1, 1918. Serial No. 242,757.

*To all whom it may concern:*

Be it known that I, GEORGE F. VON KOLNITZ, a citizen of the United States, residing at Stockertown, in the county of Northampton and State of Pennsylvania, have invented certain new and useful Improvements in Processes of Obtaining Potassium Compounds, of which the following is a specification.

In the patents to Eckel, No. 1011172, and von Kolnitz, No. 1201306, processes are disclosed for the production of potassium salts, especially the chlorid, from potassium bearing silicates, and particularly from the mineral glauconite, also known as greensand, which is a hydrous silicate of iron and potassium.

These processes involve or include the heating of the material in a mixture with calcium chlorid, or other calcium compound, forming potassium salts which may be either volatilized and then condensed or if soluble may be recovered by leaching.

The object of the present invention is to provide a process involving the material above referred to, or similar materials, in which, however, the greensand or other natural material is subjected to the action of the reagent when the latter is in the form of a gas. I have found that by this means the production of the potassium salts is facilitated, and cheapened, and attended with various practical advantages, one of which is that the gas may be separately produced, and stored if necessary and applied to the greensand or other material whenever, and in such manner, as may be desired.

The present process may be performed, for example, in the following way: Commercial calcium chlorid—the hydrous salt—is heated primarily to a temperature of less than five hundred degrees centigrade and hydrochloric acid gas is evolved, and the greensand or other potassium bearing material preheated to about 350° C. is then subjected to the action of this gas in the presence of heat, with the result that potassium chlorid is formed which may be recovered from the mass by leaching or otherwise. Conveniently the calcium chlorid may be heated in a furnace provided with a flue which conducts the fumes of hydrochloric gas into a chamber or vessel containing the greensand. This mineral, as is well known, is relatively unstable, and at a moderate temperature, in the presence of the gas, it breaks down with the formation of the chlorid of potassium which is afterward recovered from the mass.

The process therefore embodies the treatment of greensand by a gas capable of producing a reaction for the formation of a water soluble potassium salt, and this gaseous process, as distinguished from the prior processes involving the mixture and treatment of solid materials, has been found to give improved results, and may be performed at a lower temperature.

As a further example, the greensand may be placed upon a screen or the like in the upper part of a furnace in which the calcium chlorid is heated and the gas evolved passing upwardly through the screen attacks the greensand with the desired result. This performance has the advantage that the gas is used in a fresh or newly formed condition, at which time it most actively produces the reactions.

Continued or increased heating of the calcium chlorid results in the continued evolution of the hydrochloric gas as long as sufficient water is present to supply the necessary hydrogen, and it has been found that a jet of steam into the mass hastens and increases the decomposition and the production of the gas. The steam jet therefore may or may not be employed.

The invention is not limited to the particular mineral, nor to the particular salt used, but I apprehend that any of the potassium bearing silicates may be treated by a gaseous acid, or by the acid fumes derived from heating an analogous salt, with similar results.

Instead of being applied immediately to the mineral, the gas could obviously be stored in tanks, and used as desired. It has been found that the reaction with the greensand takes place best in the presence of some heat, say about 600 degrees centigrade.

The greensand mass after being treated as above indicated, for the formation of the potassium salts, is leached or otherwise treated in a known manner for the recovery of such salts, the solution being boiled down and the salt crystallized out and dried.

It is possible that when calcium chlorid is heated, either particles or vapor thereof may be driven off with the hydrochloric gas to a certain extent, but these particles or vapor when passed into the greensand, will to a corresponding extent, decompose and unite with the same and form the desired salt.

I claim:

1. The process of obtaining potassium chlorid, comprising subjecting natural potassiferous material heated to about 350° C. to the action of hydrochloric acid gas to decompose said material and form potassium chlorid and recovering the chlorid so formed.

2. The process of obtaining a potassium compound, comprising subjecting glauconite previously heated to about 350° C. to the action of hydrochloric acid to decompose the glauconite and form potassium chlorid and recovering the chlorid so formed.

3. The process of obtaining potassium chlorid, comprising subjecting heated glauconite to hydrochloric acid gas to decompose said material and form potassium chlorid, and recovering the chlorid so formed.

4. The process of obtaining a potassium salt, comprising heating calcium chlorid in a chamber in the presence of a steam jet until hydrochloric acid gas is evolved, subjecting heated greensand to the action of said gas in the same chamber to form potassium chlorid and recovering the chlorid so formed.

In testimony whereof, I affix my signature in presence of two witnesses.

GEO. F. von KOLNITZ.

Witnesses:
JAMES H. DE LONG,
WARREN L. BREINIG.